Aug. 7, 1956 H. LANDERER 2,757,768
SOLENOID CLUTCH ASSEMBLY
Filed June 10, 1954 2 Sheets-Sheet 1
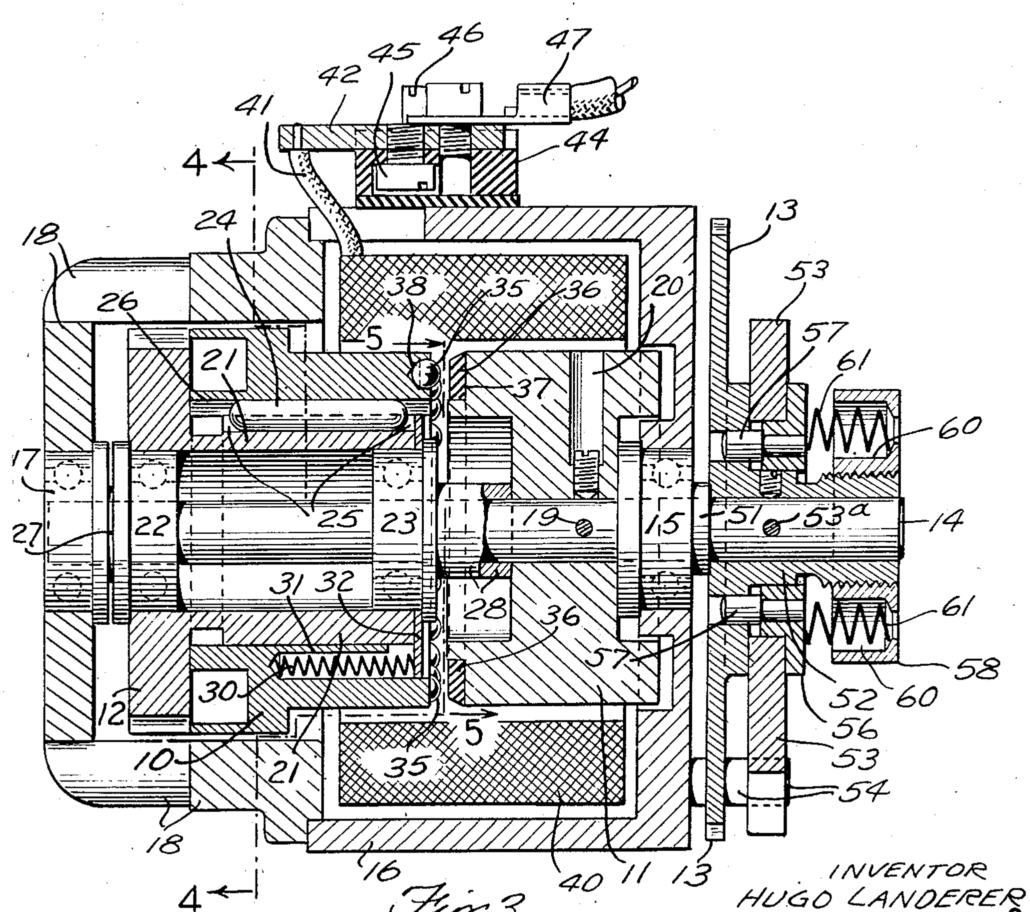
INVENTOR
HUGO LANDERER
BY Victor D. Borst
ATTORNEY SOLENOID CLUTCH ASSEMBLY
Filed June 10, 1954 2 Sheets-Sheet 2
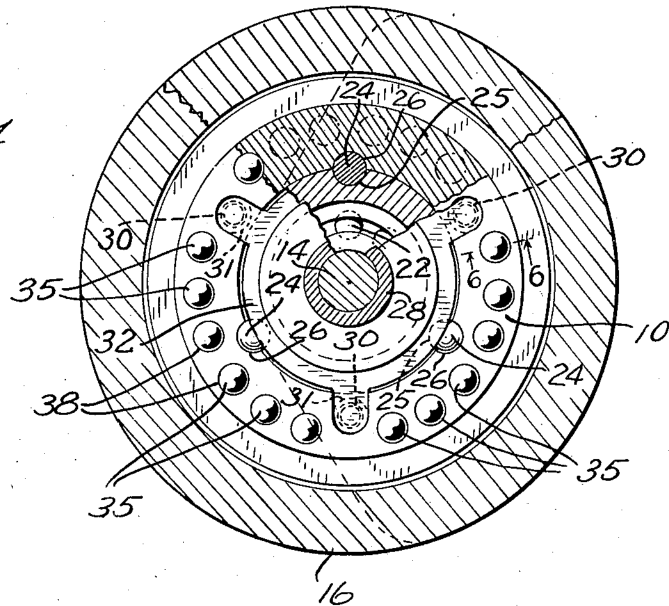
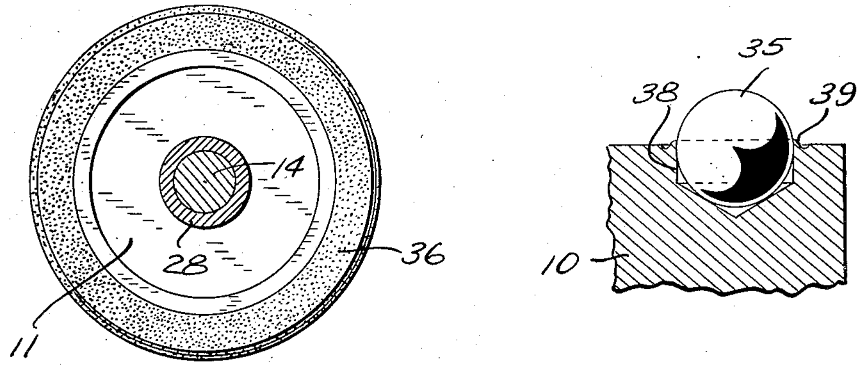
Fig. 5
Fig. 6
INVENTOR
HUGO LANDERER
BY Victor D. Borst
ATTORNEY

United States Patent Office 2,757,768

Patented Aug. 7, 1956

1

2,757,768

SOLENOID CLUTCH ASSEMBLY

Hugo Landerer, Brooklyn, N. Y., assignor to Sperry Rand Corporation, a corporation of Delaware Application June 10, 1954, Serial No. 435,742

5 Claims. (Cl. 192—67)

The present invention relates to clutch devices of the type used to secure or break rotative continuity.

Clutch devices of the interlocking or positive type have the disadvantage of causing rotational displacement of one of the elements with respect to the other, as they are brought together into mesh for connection and as they are separated out of mesh for disconnection. This relative displacement of the clutch elements engenders positional errors, which, for certain uses of the clutch requiring precision, may be undesirable. For example, in connection with certain computing mechanisms, where the driven element at certain periods is required to rotate through certain exact angles and where the rotative quantities supplied to said driven element through the power-transmitting action of the driving element are required to be laid away in a potentiometer or other storing device for future use, any positional displacement of the driven element not derived from the rotation of the driving element constitutes an error which affects adversely the accuracy of the mechanism.

Moreover, since clutch devices of the interlocking type ordinarily have toothed or jawed elements, they are noisy in their engaging and disengaging operations. This condition may be particularly undesirable when a number of such clutch devices are provided within a unit, as for example, in certain types of computing mechanisms.

One object of the present invention is to provide a new and improved clutch of the interlocking or positive type, which is smooth, noiseless and instantaneous in its engaging and disengaging operations and which effects such operations without positional error in either element of the clutch.

Another object of the present invention is to provide a new and improved holding friction and gear assembly for one of the elements of the clutch, which serves to resist yieldably rotation of said element and which may be adjusted to vary selectively the resistance imposed upon said element. Where this assembly is attached to the driven element, it serves to hold said element against accidental rotation while the clutch is in disengaged condition and to prevent said driven element from overrunning upon disengagement.

In accordance with certain features of the present invention, one of the elements of the clutch carries in its engaging end a number of teeth desirably in spherical form, and the other element has at one end an elastomeric body confronting said teeth. Upon relative movement of these elements endwise towards each other in abutment, the teeth sink into the elastomeric body, thereby causing said elements to become interlocked. If one of these elements is a driving element, this interlocking operation will either cause the other element to rotate with said driving element in cases where said other element is free to rotate as in a drive clutch, or to check said driving element in cases where said other element is fixed, as in a brake clutch.

Since the engaging operation does not involve the intermeshing of two sets of rigid teeth or jaws on the

2 clutch elements, but merely the imbedment of the teeth carried by one clutch element into the elastomeric body of the other element, complete engagement of the two clutch elements is effected smoothly, quickly and noiselessly in any selected one of infinite relative rotative positions of the two elements, without disturbing these relative positions during the engaging intervals, thereby eliminating positional errors during such intervals. Similarly, disengagement is effected quickly, smoothly and noiselessly without relative rotation of the elements during the disengaging interval.

Various other objects, features and advantages of the inventions are apparent from the following description and from the accompanying drawings, in which:

Fig. 1 is one end elevation of a clutch unit embodying the present invention;

Fig. 2 is the other end elevation of the clutch unit;

Fig. 3 is a longitudinal section of the clutch unit taken on line 3—3 of Fig. 1 but on a larger scale and showing the clutch unit disengaged;

Fig. 4 is a transverse section of the clutch unit taken on line 4—4 of Fig. 3;

Fig. 5 is a transverse section of the clutch unit taken on line 5—5 of Fig. 3; and Fig. 6 is a fragmentary detail section of the clutch unit taken on line 6—6 of Fig. 4 but on a larger scale.

Referring to the drawings, the clutch for purposes of illustration is shown of the drive type and comprises generally a pair of main rotatable axially opposed elements 10 and 11 relatively movable axially into abutting interlocking relationship. One of said elements, as for example, element 10, serves as the driving element and is in the form of a sleeve or ring driven from a drive or input gear 12 coaxial therewith. The other element 11, also in the form of a sleeve or ring, serves as the driven element and is connected to an output gear 13 coaxial therewith in a manner to be described.

For rotatably supporting the two rings 10 and 11, there is provided a driven shaft 14, supported near one end in an anti-friction bearing 15 on a frame 16 forming part of the clutch housing and supported at its other end in anti-friction bearing 17 on an open cap 18 connected to said frame by means of studs 19*a* and forming the other part of said housing. The driven ring 11 is rigidly secured to the driven shaft 14, as for example, by a taper pin 19, and has a radial hole 20 tapped at its inner end to receive a set screw by which said ring during assembly can be properly positioned on the shaft 14 before being pinned.

The driving ring 10 and the driving gear 12 are supported on the shaft 14. To that end, the gear 12 has an axial sleeve or hub extension 21 supported on the shaft 14 through anti-friction bearings 22 and 23. The driving ring 10 embraces the sleeve extension 21 of the driving gear 12 with a snug slide fit and is locked thereto for rotation therewith by means of a series of cylindrical key pins 24, three being shown equally spaced circumferentially around the axis of the sleeve extension and fitted about half into respective semi-cylindrical keyways 25 in the sleeve extension and the other half into respective semi-cylindrical keyways 26 in the driving element 10 to form a splined connection between said sleeve extension and said driving element.

The two bearings 17 and 22 are separated by a spacer collar 27 on the driven shaft 14 and the bearing 23 is separated from the driven ring 11 by means of a spacer collar 28 on said shaft.

The driving ring 10 is urged axially away from the driven ring 11 by means of springs 30, three being shown spaced circumferentially 120° apart around the axis of the driving ring and centrally between the key pins 24 and lying in respective recesses 31 in the driven element 10 of the drive gear 12. These springs 30 at one end bear against the driving ring 10 and at the other end against a retainer 32 clamped between a shoulder on the bearing 23 and the end of the sleeve extension 21 of the driving gear 12, so that the driving ring is urged by these springs against the face of this driving gear and away from the driven ring 11, as shown in Fig. 3. The driving gear 12 with its sleeve extension 21 is rotatable but is held against axial slide movement between a shoulder on the bearing 22 and the retainer 32, while the driving ring 10 is free to slide axially against the action of the springs 30 along said sleeve extension towards the driven ring 11 for engagement therewith.

For interlocking the driving and driven rings 10 and 11 upon connection, one of these rings, as for example, the driving ring 10, carries on its active engaging end a series of teeth 35 and the other ring 11 carries on its active engaging end an elastic nose 36 in the form of a disc ring confronting said teeth. The disc ring 36 made of a suitable elastomeric material, as for example, neoprene (polychloroprene), fits in a recess 37 in the end of the driven ring 11 and is desirably retained therein by means of cement of some suitable adhesive or bonding agent.

When the driving ring 10 is moved axially towards the driven ring 11 by means to be described, the teeth 35 on said driving ring sink into the elastic disc 36 on said driven ring, thereby causing said rings to become interlocked for rotation in unison without slippage.

The teeth 35 on the driving ring 10 are preferably in the form of steel balls (eighteen being shown) pressed and staked into respective holes 38 in the engaging end of said ring, as to be permanently retained therein. These holes 38 are arranged in a circle centric with the axis of the shaft 14 and are divided into three equal groups, the holes in each group being equally spaced. These holes 38 are deep enough so that the balls 35 when seated therein have their centers located inside said holes just within the plane of the end of the driving ring 10, to assure permanent retention to the balls when staked or peened therein. This staking operation is effected simply by means of a staking tool somewhat in the form of a punch, having at one end a socket to receive a ball 35. When struck with a hammer, this tool upsets and raises the metal around the ball 35 into engagement with said ball to form a small circumferential retaining flange 39 around said ball. As a result of this arrangement and construction, about half of each ball 35 projects outwardly from the engaging end of the driving ring 10 for imbedment into the elastic disc 36 upon engagement of the rings 10 and 11.

The spherical configuration of the teeth 35 has many advantages. It provides an effective, accurate, efficient and inexpensive manner of providing accurately formed teeth on one of the clutch elements. Moreover, due to the rounded surfaces presented by the teeth 35 to the elastic disc 36 free from sharp or acute corners, the entry of said teeth into said disc is achieved smoothly and quickly without cutting into the disc or in any way marring said disc. The elastic disc 36 will thereby withstand an indefinite number of make-and-break operations without breakdown.

Also, due to the rounded conformation of the teeth 35, the elastic disc 36 when in engagement with said teeth will be deformed easily, smoothly and quickly, not only around these teeth but also fully into the spaces between said teeth into contact with the surface sections of the end of the driving ring 10 between said teeth. As a result, there is produced a firm interlocking torsionally unyielding connection between the two rings 10 and 11, consisting of permanent solid teeth on one side and temporarily formed resilient teeth on the other side intermeshing and affording continuous circumferential surface contact between the two rings 10 and 11. The relative movement of the two rings 10 and 11 into this interlocking position is effected smoothly, quickly, noiselessly and instantaneously without any rotational displacement of the driven ring 11, aside from that transmitted thereto by the rotation of the driving ring 10, thereby eliminating positional errors in the clutch during the engaging interval.

Upon axial movement of the driving ring 10 away from the driven ring 11, the teeth 35 pull away from the resilient body 36 in an axial direction and effect disconnection quickly, smoothly and noiselessly without imparting to the driven element 11 any rotative displacement resulting from this disconnection. Positional error is thereby eliminated during the disengaging intreval.

The clutch illustrated is of the solenoid actuated type. For that purpose, there is provided a cylindrical magnetic coil 40 inside the housing frame 16 encompassing the rings 10 and 11 and having electrical connections 41 with a pair of bus bars 42 and 43, which are secured to an insulating bracket 44 on the top of said housing frame by screws 45. The bracket 44 is secured to the housing frame 16 by screws 46 and connected to the bus bars 42 and 43 are input and output terminals 47 and 48 adapted to be connected to a suitable source of D. C. current, as for example, one of 24 volts.

Upon energization of the coil 40, a magnetic field is set up causing the driving ring 10 to slide along the gear extension 21 into engagement with the driven ring 11 against the action of the springs 30, in a manner already described. Upon deenergization of the coil 40, the driving ring 10 is slid by the action of the springs 30 back along the gear extension 21 and out of engagement with the driven ring 11.

The driven shaft 14 projects beyond the bearing 15 to the outside of the housing frame 16. Mounted on the projecting end of this shaft 14 is a holding friction and gear assembly comprising the driven gear 13 separated from the bearing 15 by a spacer 51 and having a hub 52. This gear hub 52 embraces the shaft 14 and is rigidly secured thereto by means of a taper pin **53*a*. The gear 13 has face contact with a friction plate 53 encircling the gear hub 52 and held against rotation by means of two studs 54 which are secured to the end of the housing frame 16 and which serve also as guides along which the friction plate is free to slide. Embracing the gear hub 52 with a snug slide fit is a disc 56 connected to the gear 13 for rotation therewith by means of two pins 57. This disc 56 is pressed against the friction plate 53 by means of a split pressure adjusting clamp nut 58 threaded on the end of the gear hub 52 and having two recesses 60 to receive two springs 61 bearing against the disc 56**.

By the arrangement described, the rotation of the gear 13 upon engagement of the clutch is resisted by the friction plate 53 and the extent of this resistance can be adjusted by means of the clamp nut 58. As a result, the driven part of the clutch is held against accidental rotation during disengagement and overrun of this driven part upon disengagement is avoided.

The driven gear 13 may be made to operate any suitable device desired upon energization of the magnetic coil 40. For example, this driven gear 13 may be made to set a potentiometer to a value depending on the period of energization, for memory storing or other computing purposes.

Although the element 10 with the steel balls 35 has been described as the driving member and the element 11 with the elastic disc 36 as the driven member, as far as certain aspects of the invention are concerned, these may be reversed in their action, so that the element 11 serves as the driving member and the element 10 as the driven membr.

What is claimed is:

1. A drive clutch comprising a pair of rotatable elements having confronting ends and a common axis, one of said elements constituting a driving element, the other element constituting a driven element, one of said elements at one of said confronting ends having a series of holes of equal size spaced around a circle centric with said axis, a series of balls of equal size seated in said holes respectively and having about half thereof projecting from said holes, said balls being permanently retained in said holes respectively, a ring of elastomeric material on the other of said confronting ends centric with said axis and opposite said balls, means for axially moving one of said elements towards the other element to cause said teeth to sink into said elastomeric body and to effect thereby interlocking connection between said elements, and means for axially moving the axially movable element away from the other element to effect disconnection of said elements.

2. A drive clutch as described in claim 1, wherein one of the means for axially moving one of said elements in relation to the other element is a solenoid means, and the other means for axially moving the axially movable element in relation to the other element is spring means.

3. A clutch comprising a pair of rotatable coaxial driving and driven elements, a shaft for supporting one of said elements, means for effecting engagement of said elements, means for effecting disengagement of said elements, and a holding friction and gear assembly mounted on one of said elements to resist rotation of the latter element and comprising a gear fixed to said shaft, a friction plate encircling said shaft and having one face in friction contact with said gear, said plate being fixed against rotation about the axis of said shaft and being movable along said shaft towards and away from said gear, a rigid disc encircling said shaft and disposed in friction contact with the other face of said friction plate, means connecting said disc to said gear for rotation therewith while permitting said disc to be moved along said shaft relative to said gear, a nut threaded on said shaft, and spring means between said nut and said disc pressing said disc against said plate and thereby said plate against said gear.

4. A clutch comprising a pair of opposed elements having confronting ends, one of said elements carrying on one if said ends a series of hemispherical teeth projecting towards the other element, said other element carrying on the other of said ends opposite said teeth a body of elastomeric material, one of said elements constituting a driving element rotatable about an axis, said teeth being spaced around a circle centric with said axis, means for axially moving said elements relatively endwise towards each other to cause said teeth to sink into said elastomeric body and to effect thereby interlocking connection between said elements, and means for axially moving said elements endwise relatively away from each other to effect disconnection of said elements.

5. A clutch as described in claim 4, wherein the element carrying the teeth has a series of holes at one of said confronting ends and wherein said teeth consist of balls seated in said holes respectively so that about half of the balls project from said holes.

References Cited in the file of this patent

UNITED STATES PATENTS

| | | |
|---|---|---|
| 1,141,230 | Burke | June 1, 1915 |
| 1,455,491 | Huet | May 15, 1923 |
| 2,180,412 | Hart | Nov. 21, 1939 |
| 2,359,267 | Horowitz | Sept. 26, 1944 |
| 2,416,083 | Battaline | Feb. 18, 1947 |
| 2,690,246 | Kelleigh | Sept. 28, 1954 |